3,661,856
DYEABLE POLYESTER
Anthony L. Lemper, Tonawanda, N.Y., and Yuzi Okuzumi, Akron, Ohio, assignors to The Goodyear Tire & Rubber Company, Akron, Ohio
No Drawing. Continuation-in-part of application Ser. No. 873,694, Nov. 3, 1969. This application June 29, 1971, Ser. No. 158,125
Int. Cl. C08g 17/14
U.S. Cl. 260—75 S                16 Claims

ABSTRACT OF THE DISCLOSURE

Polyethylene terephthalate and terephthalate copolyesters in fibers and fabrics are treated with an alkali metal salt of 2-bromoethane sulfonic acid to render the fibers and fabrics more dyeable with cationic dyestuffs.

---

This application is a continuation-in-part of application Ser. No. 873,694 filed Nov. 3, 1969 and now abandoned.

This invention relates to fibers and fabrics of polyalkylene terephthalates and copolyesters containing a terephthalate group such as copolyesters of dihydric alcohol, terephthalic acid and dimer acid (see U.S. Pat. 3,390,108). copolyesters of ethylene terephthalate and ethylene isophthalate and other copolyesters hereinafter mentioned. More particularly the invention relates to improving the cationic dyeability of such polyesters and copolyesters by treating the polymers with an alkali metal salt of 2-bromoethane sulfonic acid.

The polyesters useful in accordance with the present invention are thermoplastic linear, highly polymerized esters of terephthalic acid and glycols of the formula $$HO(CH_2)_nOH$$

where $n$ is an integer of from 2 to 10. The copolyesters used in this invention may comprise ethylene terephthalate-ethylene isophthalate copolyesters as more fully described hereinafter.

In producing polyalkylene terephthalates there is involved the interaction of at least two molecular proportions of a glycol (preferably ethylene glycol) per molecular proportion of terephthalic acid with the splitting out of water. Subsequent heating of the resulting glycol ester of terephthalic acid at about 250° C. to 280° C. under 0.05 to 20 millimeters of mercury pressure absolute results in the production of high polymer with the splitting out of glycol which is removed from the reaction mixture.

Polyesters such as polyethylene terephthalate can also be prepared by reacting the glycol and free dicarboxylic acid in low molecular weight polyester resin such as low molecular weight polyester having a degree of polymerization of from about 1.4 to 20 to form low polymer. In this method low ratios of glycol to acid are used. The product is condensed to form high molecular weight polyester. The final condensation is carried out at a temperature in the range of from about 250° C. to 300° C. at a pressure of from about 1 to 10 millimeters of mercury pressure, preferably below 1 millimeter of mercury pressure until the polymeric polyester formed has an intrinsic viscosity of at least 0.4 as measured in a 60/40 phenol-tetrachloroethane mixed solvent at 30.0° C.

Highly polymeric polyalkylene terephthalates, useful for the purposes of the invention, may also be produced by heating terephthalic acid bodies, such as ester forming derivatives of terephthalic acid with at least one glycol. Suitable ester forming derivatives are aliphatic or aromatic esters of terephthalic acid such as $C_1$ to $C_4$ alkyl esters and/or aryl esters such as those from phenol, cresols and the like. The preferred derivatives are methyl and ethyl terephthalates.

In this procedure first there is a transesterification reaction (or ester interchange reaction) to bis-2-hydroxyethyl terephthalate at about 190° C. to 250° C. for 0.5 to 5.0 hours with the evolution of alcohol. Subsequently, upon heating at about 250° C. to 280° C. under 0.05 to 20 millimeters of mercury absolute pressure there is a polycondensation reaction for 0.5 to 8.0 hours to high polymer with splitting out (and removal) of glycol. Each reaction is preferably catalyzed. Zinc diacetate and other known catalysts are employed to speed up the ester exchange reaction and antimony oxide or other known catalysts are employed to promote the subsequent polycondensation reaction.

The preparation of ethylene terephthalate-ethylene isophthalate copolyesters is also within the scope of the invention and is along previously described lines. It is described in detail in U.S. Pat. 2,965,613 to Milone et al.

Other linear aromatic polyester resins useful for the purposes of the invention include, among others, not only polyethylene terephthalate and copolyesters of ethylene terephthalate and ethylene isophthalate, but also such polyesters as those of cyclohexane dimethylol terephthalate, polyethylene-2,6-naphthalate and copolyesters of terephthalic acid which contain at least 75 mol percent of terephthalic acid. Also, copolyesters may be derived from a glycol, terephthalic acid and dimer acid as disclosed in U.S. Pat. 3,390,108 to Keck et al.

In accordance with the invention cationic dyeable polyesters and copolyesters are produced by the addition of an alkali metal (preferably sodium) salt of 2-bromoethane sulfonic acid preferably after the ester interchange reaction and before the removal of excess glycol. The amount of said sulfonic acid may vary from 0.2 to 15 mol percent, advantageously 0.5 to 10 mol percent and preferably 1 to 5 mol percent.

When the polyester is prepared by reacting the glycol and free dicarboxylic acid the salt of 2-bromoethane sulfonic acid is preferably added to the esterification reaction product, preferably to low molecular weight polyester having an average degree of polymerization of from about 1.4 to 20 and the low molecular weight polyester is polycondensed to form high molecular weight polyester using a condensation catalyst such as litharge, titanium glycolate or antimony trioxide to accelerate the condensation reaction.

Typical cationic (basic) dyestuffs suitable for the purposes of the invention include, among others, Rhodamine B, Sevron Blue (Basic Blue 35), Sevron Brilliant Red 35 (Basic Violet 15), Sevron Yellow 3RL (Basic Yellow 15), Sandocryl Blue B–36 (Basic Blue 3), Sandocryl Red 3–B (Basic Red 15), Sandocryl Yellow B4RL (Basic Yellow 32), Chrysodine CR (Basic Orange 1), Amacryl Brilliant Red 4G (Basic Red 14), Victoria Blue B (Basic Blue 26), and the like. The dye used in the following examples is Rhodamine B and has the following structure:

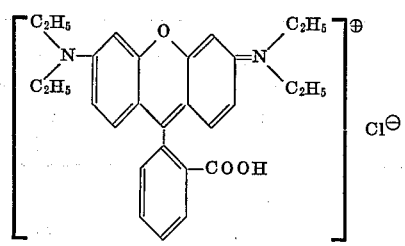

The principle and practice of this invention are illustrated in the following examples.

The term "intrinsic viscosity" is explained in U.S. Pat. 2,965,613 to Milone et al. The terms "hydrolytic stability" and "carboxy content" are illustrated in U.S. Patent 3,446,763.

EXAMPLE 1

Seventy (70) grams of dimethyl terephthalate, 44 milliliters of ethylene glycol and 21 milligrams of zinc acetate were placed in a glass tube reactor fitted with condenser and nitrogen inlet. The reaction mixture was heated to 240° C. and maintained at this temperature for one hour. Then, after theoretical amount of methanol was distilled out, 2.3 grams (3 mol percent) based on dimethyl terephthalate of 2-bromoethane sulfonic acid sodium salt was added and the reaction mixture was heated for 30 minutes at 240° C. Then 21 milligrams of antimony trioxide was added. The reaction mixture was placed under vacuum (0.5 millimeter of mercury) and heated to 280° C. for one hour. Polymer thus obtained possessed ultimate intrinsic viscosity of 0.446 and melting point of 218° C. Fiber spun from this polymer was dyed in 1:1 Rhodamine B dye bath. The fiber dyed to deep red shade.

EXAMPLES 2 AND 3

The same general procedure as in Example 1 was repeated, except the amount of 2-bromoethane sulfonic acid sodium salt was varied. The results are summarized in the following table:

TABLE I

| $BrCH_2CH_2SO_3Na$ mol percent | Dyeability with Rhodamine B | Intrinsic viscosity | HD, percent BB | COOH, g./10⁶ g. | Melting pt., ° C. |
|---|---|---|---|---|---|
| Example: | | | | | |
| 3 | 0.5 Fair | 0.523 | 0.13 | 15 | 252 |
| 2 | 2.0 Good | 0.528 | 0.21 | 29 | 245 |
| 1 | 3.0 Excellent | 0.446 | 0.27 | 35 | 218 |

EXAMPLE 4

Five and five-tenths (5.5) pounds of dimethyl terephthalate, 3.57 pounds of ethylene glycol, 1.5 grams of manganese acetate were placed in a reactor. The reaction mixture was agitated and heated to the temperature range of 200° C. to 250° C. under nitrogen atmosphere. Methanol produced in the reaction was removed from the reaction mixture through a distillation column. After ester exchange reaction was completed 0.567 gram of antimony trioxide catalyst based on dimethyl terephthalate and designated amount of sodium salt of 2-bromoethane sulfonic acid were added as shown in the table. The reaction mixture was then subjected to reduced pressure of 0.5 millimeter of mercury gauge and a temperature of 260° C. to 280° C. At the desired intrinsic viscosity the product was discharged. This polymer was converted to 150/68 denier/filament yarn. Fabric made from this yarn was dyed in Sevron Blue dye bath at 90° C. for one hour, then it was scoured and dried. Fabric with deep blue shade was obtained.

EXAMPLES 5 AND 6

The same procedure as in Example 4 was repeated, except the amount of 2-bromoethane sulfonic acid sodium salt are varied. Results are shown in Table II below:

TABLE II

| $BrCH_2CH_2SO_3Na$, mol percent | Dyeability with Sevron Blue | Intrinsic viscosity | HD, percent BB | COOH, g./10⁶ g. | Melting pt., ° C. |
|---|---|---|---|---|---|
| Example: | | | | | |
| 4 | 2.5 Excellent | 0.447 | 0.27 | 17 | 233 |
| 5 | 2.0 Good | 0.554 | 0.23 | 20 | 238 |
| 6 | 1.5 Fair | 0.617 | 0.19 | 22 | 242 |

EXAMPLE 7

498 grams of terephthalic acid and 242 grams of ethylene glycol were added to 600 grams of molten low molecular weight poly(ethylene terephthalate). The reaction mixture was maintained at 260° C. for two hours under nitrogen atmosphere at 50 pounds per square inch gauge pressure. The water produced from the reaction was removed through a fractional distillation column. After the completion of esterification resin the nitrogen pressure was reduced to at atmospheric pressure. Then 16 grams of 2-bromoethane sulfonic acid sodium salt and 0.125 gram of antimony trioxide were added. The reaction mixture was polycondensed at 280° C. for three hours at 0.05 millimeter of mercury pressure. The product had an intrinsic viscosity of 0.657 and a melting point of 247° C. Fabric prepared from the above polymer was dyed in an aqueous solution of Sevron Brilliant Red 3B. The fabric dyed to a deep shade.

Copolyesters containing units that improve disperse dyeability prepared according to the present process have improved cationic dyeability in addition to improved disperse dyeability. Thus the copolymers of dimer acid referred to above have improved dyeability, both disperse and cationic. Copolyesters containing other disperse dyeability improving units can also be improved in cationic dyeability. Representative examples of other units that improve disperse dyeability are units of isophthalic acid, azelaic acid, tetramethylene glycol, polyethers such as polyethylene glycol, polypropylene glycol and polytetramethylene glycol. Other disperse dyeability improving units can be incorporated in the copolyesters if desired. Generally up to about 10 mol percent of such units are used. The preferred copolyesters are copolyesters of ethylene terephthalate with up to 10 percent of such units such as the ethylene terephthalate-ethylene isophthalate copolyesters; ethylene terephthalate-ethylene azelate copolyesters; ethylene terephthalate-poly(ethylene glycol) terephthalate copolyesters; ethylene terephthalate-poly(propylene glycol) terephthalate copolyesters and ethylene terephthalate - poly(tetramethylene glycol) terephthalate copolyesters.

It is considered that the bromoethane sulfonic acid salt acts as a chain terminating agent and that bromine from this material combines with active hydrogen from the hydroxyl or carboxyl end group of the polymer chain and is eliminated. By the elimination of HBr in this way and a combination of the ethane sulfonic acid salt with the polymer the sulfonic acid salt is substituted onto the polymer chain end. For illustrative purposes the reaction may be considered to take place as follows:

(a) For glycol terminated polymer chain:

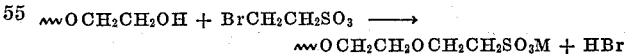

(b) For carboxyl terminated polymer chain:

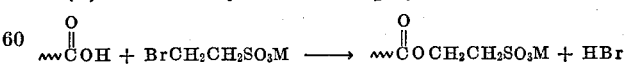

In the above equations M represents alkali metal such as sodium. This is used for illustrative purposes. In practice other alkali metal salts such as the lithium, potassium and rubidium salts can be used.

While certain representative embodiments and details have been shown for the purpose of illustrating the invention it will be apparent to those skilled in this art that various changes and modifications may be made therein without departing from the spirit or scope of the invention.

What we claim is:

1. In a process for preparing a dyeable alkylene terephthalate polyester the improvement which comprises mixing said polyester after ester interchange and before polycondensation with about 0.2 to 15.0 mol percent of an alkali metal salt of 2-bromoethane sulfonic acid and heating the reaction mixture for about 10 to 60 minutes at about 210° to 250° C. prior to polycondensation.

2. The polyester of claim 1 in which the polymer is a copolyester.

3. The polyester of claim 1 in which the polymer is a copolyester of ethylene terephthalate and ethylene isophthalate.

4. The polyester of claim 1 in which the polymer is poly(1,4-cyclohexane dimethylene) terephthalate.

5. The polyester of claim 1 in which the polymer is a copolyester which is the reaction product of at least one glycol, terephthalic acid and a dimer acid.

6. An improved cationic dyeable alkylene terephthalate polyester which has been prepared by the method of claim 1.

7. A process in accordance with claim 1 in which the polyester is a copolyester.

8. A process in accordance with claim 1 in which the polyester is a copolyester of ethylene terephthalate and ethylene isophthalate.

9. A process in accordance with claim 1 in which the polyester is a copolyester which is the reaction product of at least one glycol, terephthalic acid and a dimer acid.

10. The process in accordance with claim 1 in which the polyester is poly(1,4-cyclohexane dimethylene) terephthalate.

11. The polyester of claim 1 in the form of a fiber.

12. The polyester of claim 1 in the form of a fabric.

13. A process for preparing a dyeable alkylene terephthalate polyester resin which comprises mixing low molecular weight polyester resin with from about 0.2 to 15 mol percent of an alkali metal salt of 2-bromoethane sulfonic acid and heating and condensing the low molecular weight polyester to form high molecular weight polyester having an intrinsic viscosity of at least 0.4.

14. A process according to claim 13 in which the polyester is a copolyester.

15. A process according to claim 13 in which the polyester is polyethylene terephthalate.

16. An alkylene terephthalate polyester which contains chain ends terminated with a $CH_2CH_2SO_3M$ group in which M is an alkali metal.

References Cited

UNITED STATES PATENTS 3,310,532   3/1967   Kazama et al. _____ 260—75

WILLIAM H. SHORT, Primary Examiner

L. L. LEE, Assistant Examiner

U.S. Cl. X.R.

8—55